(12) United States Patent
Lu

(10) Patent No.: US 10,173,396 B2
(45) Date of Patent: Jan. 8, 2019

(54) HIGH RIGIDITY INTERLAYERS AND LIGHT WEIGHT LAMINATED MULTIPLE LAYER PANELS

(71) Applicant: Solutia Inc., St. Louis, MO (US)

(72) Inventor: Jun Lu, East Longmeadow, MA (US)

(73) Assignee: Solutia Inc., St. Louis, MO (US)

( * ) Notice: Subject to any disclaimer, the term of this patent is extended or adjusted under 35 U.S.C. 154(b) by 0 days.

(21) Appl. No.: 13/781,906

(22) Filed: Mar. 1, 2013

(65) Prior Publication Data

US 2013/0236711 A1 Sep. 12, 2013

Related U.S. Application Data

(60) Provisional application No. 61/609,102, filed on Mar. 9, 2012.

(51) Int. Cl.
*B32B 17/10* (2006.01)
*B32B 7/02* (2006.01)
*B32B 27/30* (2006.01)

(52) U.S. Cl.
CPC .......... *B32B 17/10761* (2013.01); *B32B 7/02* (2013.01); *B32B 17/10036* (2013.01); *B32B 17/1055* (2013.01); *B32B 27/30* (2013.01); *B32B 2250/02* (2013.01); *B32B 2250/03* (2013.01); *B32B 2250/40* (2013.01); *B32B 2307/102* (2013.01); *B32B 2307/536* (2013.01); *B32B 2329/06* (2013.01); *B32B 2419/00* (2013.01); *B32B 2605/006* (2013.01); *Y10T 428/2495* (2015.01); *Y10T 428/24983* (2015.01)

(58) Field of Classification Search
CPC .......... B32B 17/10036; B32B 17/1055; B32B 17/10761; B32B 27/30; B32B 7/02; B32B 2419/00; B32B 2250/40; B32B 2307/102; B32B 2307/536; B32B 2250/02; B32B 2329/06; B32B 2605/006; B32B 2250/03; Y10T 428/24983; Y10T 428/2495

USPC .......................................................... 428/213
See application file for complete search history.

(56) References Cited

U.S. PATENT DOCUMENTS

| | | |
|---|---|---|
| 4,707,304 A | 11/1987 | Gozman |
| 6,432,522 B1 | 8/2002 | Friedman et al. |
| 7,342,171 B2 | 3/2008 | Khouri et al. |
| 7,867,605 B2 | 1/2011 | Moran |
| 8,313,838 B2 | 11/2012 | Steuer et al. |

(Continued)

FOREIGN PATENT DOCUMENTS

| | | |
|---|---|---|
| JP | 2010-235432 A | 10/2010 |
| WO | WO 99/39906 A1 | 8/1999 |

(Continued)

OTHER PUBLICATIONS

PCT International Search Report and Written Opinion dated Jun. 21, 2013 for International Application No. PCT/US2013/029779.

(Continued)

*Primary Examiner* — Brian Handville
(74) *Attorney, Agent, or Firm* — Michelle Bugbee

(57) ABSTRACT

This disclosure is related to the field of polymer interlayers for multiple layer panels and multiple layer panels having at least one polymer interlayer sheet. Specifically, this disclosure is related to the field of high rigidity interlayers and light weight laminated multiple layer panels incorporating high rigidity interlayers.

14 Claims, 3 Drawing Sheets

(56) References Cited

U.S. PATENT DOCUMENTS

| | | | |
|---|---|---|---|
| 2005/0170160 A1* | 8/2005 | Moran et al. | 428/214 |
| 2006/0210776 A1* | 9/2006 | Lu et al. | 428/192 |
| 2006/0210782 A1* | 9/2006 | Lu | 428/212 |
| 2007/0148472 A1 | 6/2007 | Masaki et al. | |
| 2008/0128018 A1 | 6/2008 | Hayes | |
| 2008/0268270 A1 | 10/2008 | Chen et al. | |
| 2008/0286542 A1* | 11/2008 | Hayes et al. | 428/213 |
| 2009/0114268 A1 | 5/2009 | Buller et al. | |
| 2010/0028642 A1 | 2/2010 | Steuer et al. | |
| 2012/0244329 A1 | 9/2012 | Iwamoto et al. | |
| 2012/0244364 A1 | 9/2012 | Iwamoto et al. | |
| 2013/0074931 A1* | 3/2013 | Chen | C08K 5/1515 136/259 |
| 2014/0363652 A1 | 12/2014 | Lu et al. | |
| 2015/0079366 A1 | 3/2015 | Lu | |
| 2015/0079373 A1 | 3/2015 | Lu | |
| 2016/0200076 A1 | 7/2016 | Lu | |

FOREIGN PATENT DOCUMENTS

| | | | |
|---|---|---|---|
| WO | WO 0143963 A1 * | 6/2001 | |
| WO | WO 03/006240 A1 | 1/2003 | |
| WO | WO 2006/101960 A | 9/2006 | |
| WO | WO 2006/102049 A3 | 9/2006 | |
| WO | WO 2007/005711 A1 | 1/2007 | |
| WO | WO 2014/076114 A1 | 5/2014 | |

OTHER PUBLICATIONS

Copending application U.S. Appl. No. 14/552,575, filed Nov. 25, 2014, Jun Lu. Now Publication No. 2015/0079366.
Copending application U.S. Appl. No. 14/552,595 filed Nov. 25, 2014, Jun Lu. Now Publication No. 2015/0079373.
Extended European Search Report dated Oct. 5, 2015 for Application No./Patent No. 13757479A-1308 / 2822761 PCT/US2013029779.
Copending application. U.S. Appl. No. 14/879,373 filed Oct. 9, 2015, Jun Lu. Now Publication No. 2016-0200076
Copending application U.S. Appl. No. 14/879,596 filed Oct. 9, 2015, Jun Lu.
Copending application U.S. Appl. No. 14/879,720 filed Oct. 9, 2015, Jun Lu.
Office Action dated Jun. 21, 2016 received in co-pending U.S. Appl. No. 14/552,595.
Office Action dated Jun. 22, 2016 received in co-pending U.S. Appl. No. 14/879,373.
Office Action dated Jun. 22, 2016 received in co-pending U.S. Appl. No. 14/552,575.
PCT international Search Report and Written Opinion dated Dec. 8, 2016 for International Application No. PCT/US2016/054055.
Office Action dated Sep. 12, 2017 received in co-pending U.S. Appl. No. 14/879,720.
Office Action dated Nov. 13, 2017 received in co-pending U.S. Appl. No. 14/879,596.

* cited by examiner

HIGH RIGIDITY INTERLAYERS AND LIGHT WEIGHT LAMINATED MULTIPLE LAYER PANELS

CROSS-REFERENCES TO RELATED APPLICATION

This application claims priority to U.S. Provisional Application No. 60/609,102, filed Mar. 9, 2012, the disclosure of which is incorporated herein by reference in its entirety.

FIELD OF THE INVENTION

This disclosure is related to the field of polymer interlayers for multiple layer panels and multiple layer panels having at least one polymer interlayer sheet. Specifically, this disclosure is related to the field of high rigidity interlayers and light weight laminated multiple layer panels incorporating high rigidity interlayers.

DESCRIPTION OF PREFERRED EMBODIMENT(S)

Figure 1:
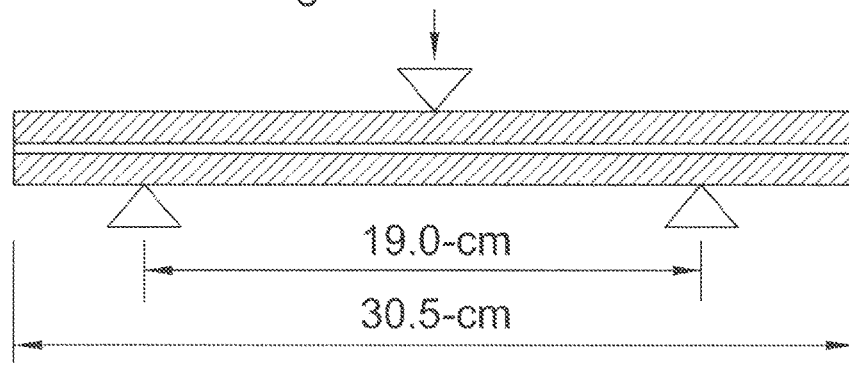
FIG. 1 is a diagram showing the three-point bending test of an embodiment and the test setup.

Generally, multiple layer panels are comprised of two sheets of glass, or other applicable substrates, with a polymer interlayer sheet or sheets sandwiched there-between. Multiple layer panels are generally produced by placing at least one polymer interlayer sheet between two substrates to create an assembly. It is not uncommon for multiple polymer interlayer sheets to be placed within the two substrates, creating a multiple layer panel with multiple polymer interlayers. After removal of air from the assembly, the constituent parts of the assembly are preliminarily press-bonded together by a method known to one of ordinary skill in the art. A final unitary structure is formed by rendering the preliminary press bonding more permanent by a lamination process such as, but not limited to, autoclaving.

Poly(vinyl butyral) (hereinafter referred to as "PVB") is a polymer that is commonly utilized in the manufacture of polymer interlayers and multiple layer panels. One of the main functions of multiple layer panels formed with one or more PVB interlayers is to absorb energy, such as that caused by the force of an object striking the panel, without allowing penetration through the panel or the dispersion of shards of glass. Thus, when these panels are utilized in the windows of motor vehicles, airplanes, structures, or other objects (their common applications) they have the effect of minimizing damage or injury to the persons or objects within the enclosed area of the object. In addition to the safety benefits, the polymer interlayers of multiple layer panels can be utilized to impart other advantageous effects to the panel including, but not limited to: acoustic noise attenuation, reduction of UV and/or IR light transmission, and enhancement of the general appearance and aesthetic appeal of window openings.

Recently, due, in part, to growing societal concerns over the fuel efficiency of automotive and aeronautical transportation, there has been a demand for multiple layer panels lighter in weight than traditional models. This demand arises from the fact that weight has a direct correlation with the fuel efficiency of a car or plane; heavier vehicles require more fuel to move from point A to point B. Generally, multiple layer panels comprise a large portion—about 45-68 kilograms—of the weight of modern motor vehicles. Due to aesthetic add-ons, such as sun roofs or panoramic roofs and larger windshields, the percentage of the weight of an automobile attributed to multiple layer panels is even increasing in some modern car models. A decrease in the weight of the multiple layer panels utilized in these applications would generally result in a significant decrease in the overall weight of the vehicle and a correlated increase in fuel efficiency. Most of the weight in these panels lies not in the weight of the interlayer, but in the weight of the substrates.

Traditionally, the multiple layer panels utilized for automotive applications (such as the windshield, sun or moon roof, and side and rear windows) are typically comprised of two sheets of glass of the same thickness with a PVB interlayer disposed in between. Generally, the thickness of each substrate sheet in these applications is about 2.0 mm to 2.3 mm.

Lighter weight multiple layer panels are achieved by using thinner glass of either symmetric or asymmetric substrate configurations. Current modalities utilized to achieve lighter weight multiple layer panels for windshields generally involve asymmetric substrate configurations. In these configurations, the thickness of the outboard substrate (i.e., the substrate facing the outside of the vehicle cabin) is maintained at the traditional thickness of about 2.0 mm to 2.3 mm, while the thickness of the inboard substrate (i.e., the substrate facing the interior of the cabin) is reduced. The thickness of the outboard substrate is retained at about 2.0 mm to 2.3 mm to maintain the strength of the panel to sustain the force of sand, gravel and other road debris and hazards that can impact a motor vehicle during transportation. The thickness of the inboard substrate is reduced to lower the total overall weight of the panel. The total glass thickness of asymmetric window panels for use in windshields can be configured to be as low as 3.7 mm.

While the asymmetric substrate configurations are typically used for windshields to achieve lighter weight, symmetrical substrate configurations are typically utilized in multiple layer panels in the side windows and roof windows of cars. Generally, panels used in these windows are heat strengthened in order to provide a structural and mechanically strong glazing to resist the chips and cracking which can be caused by door slamming, movement of the panels as windows are lowered and raised, movement of roof panels and the impact of small objects on the panel. The total glass thickness of symmetric window panels for use in side and roof windows can be configured to be as low as 3.6 mm.

Due to decreased overall thickness, multiple layer panels produced by asymmetric substrate configurations provide an opportunity for weight savings and, hence, improved fuel economy in automotive and aeronautical applications. For example, typically, a windshield has a surface area of approximately 1.4 m². For a traditional 2.1 mm/2.1 mm glass configuration with a conventional PVB interlayer, the total weight of the windshield is about 15.8 kg. For an asymmetric glass configuration, such as 2.1 mm/1.6 mm (which is one of the lowest combined glass thicknesses currently utilized in commercial use) the weight of the asymmetric windshield is about 14.1 kg—a 1.7 kg, 10.8% weight savings over traditional multiple layer panels.

While asymmetric multiple layer panels do result in increased weight savings, it is not without a price. One major concern is that light weight multiple layer panels produced through asymmetric modalities, while lighter, are not as strong as multiple layer panels produced through traditional methods. The mechanical strength of windshield glass, such as deflection stiffness, decreases as the thickness of the glass decreases. For example, a 3.7 mm monolithic glass panel has a 33% reduction in deflection stiffness in comparison to a 4.2 mm monolithic glass panel. Thus, the glass bending strength, glass edge strength, glass impact strength, roof strength and torsional rigidity are all reduced in these panels.

The strength of the panels used in automotive windows is important, in part, because, in today's vehicles the panels are part of the structure of the vehicle and contribute to the overall mechanical strength and rigidity of the vehicle body, especially the vehicle roof. For example, on a Ford P2000 body the torsional rigidity of the body is 24.29 kNm/angle of degree with the windshield and back glass in place and 16.44 kNm without the glass in place. See M. A. Khaleel, et al., Effect of Glazing System Parameters on Glazing System Contribution to a Lightweight Vehicle's Torsional Stiffness and Weight. *International Body and Engineering Conference, Detroit*, (2000) SAE paper No. 2000-01-2719 (the entire disclosure of which is incorporated herein by reference). The glass contributes to about 30% of the overall rigidity of the car. This contribution to the automotive structure is important both in normal car operations and in the event of a collision or other accident. If the strength of the multiple layer panels in the automotive windows is compromised for the sake of lower weight and greater fuel efficiency, a decrease in the structural rigidity and overall safety of the vehicle would result.

Due to all of the problems associated with asymmetrically configured multiple layer panels, there is a need in the art for a light weight multiple layer panel with improved mechanical strength, and thus improved structural rigidity and overall safety of the vehicle. It is therefore the objective of the current invention to design a light weight multiple layer panel comprising an interlayer in which the decreased mechanical strength of the panel as a result of reduced glass thickness is compensated at least in part by the interlayer.

Because of these and other problems in the art, described herein, among other things is a light weight multiple layer glass panel comprising: a first glass substrate; a second glass substrate; and at least one polymer interlayer disposed between the first glass substrate and the second glass substrate, the polymer interlayer having a glass transition temperature of greater than or equal to about 33 degrees Celsius. The combined thickness of the first glass substrate and the second glass substrate is less than or equal to about 4.0 mm. Additionally, the multiple layer glass panel has a deflection stiffness that is higher than the deflection stiffness of a multiple layer panel of the same thickness and glass configuration but with a conventional (non-stiff) interlayer, and in some embodiments, the multiple layer glass panel has a deflection stiffness that is at least 10% higher, or at least 20% higher than the deflection stiffness of a multiple layer panel of the same thickness and glass configuration but with a conventional (non-stiff) interlayer. In some embodiments, the multiple layer panel has a deflection stiffness of greater than or equal to about 300 Newtons per centimeter, greater than about 320 Newtons per centimeter, or greater than about 360 Newtons per centimeter, when the combined thickness of the first glass substrate and the second glass substrate is less than or equal to 4.0 mm, or less than or to 3.9 mm, or less than or equal to 3.7 mm.

In some embodiments, the polymer interlayer comprises plasticized poly(vinyl butyral). The combined thickness of the first glass substrate and the second glass substrate also may be less than or equal to about 3.9 mm or less than or equal to about 3.7 mm. In other embodiments, the polymer interlayer has a glass transition temperature of greater than or equal to about 35 degrees Celsius.

Also disclosed herein is a multiple layer glass panel comprising: a first glass substrate; a second glass substrate; and a multilayered interlayer disposed between the first glass substrate and the second glass substrate. The multilayered interlayer comprises: a first plasticized polymer layer having a glass transition temperature of greater than or equal to about 33 degrees Celsius; and a second plasticized polymer layer in contact with the first plasticized polymer layer, the second plasticized polymer layer having a glass transition temperature less than 30 degrees Celsius. The combined thickness of the first glass substrate and the second glass substrate is less than or equal to about 4.0 mm. The multiple layer glass panel has a deflection stiffness that is higher than the deflection stiffness of a multiple layer panel of the same thickness and glass configuration but with a conventional (non-stiff) multilayered interlayer, and in some embodiments, the multiple layer glass panel has a deflection stiffness that is at least 10% higher, or at least 20% higher than the deflection stiffness of a multiple layer panel of the same thickness and glass configuration but with a conventional (non-stiff) multilayered interlayer. In some embodiments, the multiple layer panel has a deflection stiffness of greater than or equal to about 240 Newtons per centimeter when the combined thickness of the first glass substrate and the second glass substrate is less than or equal to 4.0 mm, or less than or to 3.9 mm, or less than or equal to 3.7 mm. Additionally, the multiple layer glass panel has a sound transmission loss of greater than or equal to about 36 decibels.

In some embodiments, the first plasticized polymer layer comprises plasticized poly(vinyl butyral) and the second plasticized polymer layer comprises plasticized poly(vinyl butyral). Additionally, the panel may include a third plasticized polymer layer comprised of plasticized poly(vinyl butyral), with the second plasticized polymer layer disposed between the first plasticized polymer layer and the third plasticized polymer layer.

In other embodiments, the multiple layer glass panel has a deflection stiffness that is higher than the deflection stiffness of a multiple layer panel of the same thickness and glass configuration but with a conventional (non-stiff) interlayer, and in some embodiments, the multiple layer glass panel has a deflection stiffness that is at least 10% higher, or at least 20% higher than the deflection stiffness of a multiple layer panel of the same thickness and glass configuration but with a conventional (non-stiff) interlayer. In some embodiments, the multiple layer panel has a deflection stiffness of greater than about 250 Newtons per centimeter. In still other embodiments, the multiple layer glass panel has a deflection stiffness of greater than about 280 Newtons per centimeter when the combined thickness of the first glass substrate and the second glass substrate is less than or equal to 4.0 mm, or less than or to 3.9 mm, or less than or equal to 3.7 mm. The combined thickness of the first glass substrate and the second glass substrate also may be less than or equal to about 3.9 mm or less than or equal to about 3.7 mm.

Additionally, the first plasticized polymer layer may have a glass transition temperature of greater than or equal to about 36 degrees Celsius, or the second plasticized polymer layer may have a glass transition temperature of less than or equal to about 20 degrees Celsius.

Also disclosed herein is a multiple layer glass panel comprising: a first glass substrate; a second glass substrate; and a multilayered interlayer disposed between the first glass substrate and the second glass substrate. The multilayered interlayer comprises: a first plasticized polymer layer with a residual hydroxyl content of greater than or equal to about 19 weight percent and a plasticizer content of less than or equal to about 35 phr; and a second plasticized polymer layer in contact with the first plasticized polymer layer, the second plasticized polymer layer having a residual hydroxyl content of less than or equal to about 16 weight percent and a plasticizer content of greater than or equal to about 48 phr. The combined thickness of the first glass substrate and the second glass substrate is less than or equal to about 4.0 mm, and the multiple layer glass panel has a deflection stiffness that is higher than the deflection stiffness of a multiple layer panel of the same thickness and glass configuration but with a conventional (non-stiff) interlayer, and in some embodiments, the multiple layer glass panel has a deflection stiffness that is at least 10% higher, or at least 20% higher than the deflection stiffness of a multiple layer panel of the same thickness and glass configuration but with a conventional (non-stiff) interlayer. In some embodiments, the multiple layer panel has a deflection stiffness of greater than or equal to about 240 Newtons when the combined thickness of the first glass substrate and the second glass substrate is less than or equal to 4.0 mm, or less than or to 3.9 mm, or less than or equal to 3.7 mm. Additionally, the multiple layer glass panel has a sound transmission loss of greater than or equal to about 36 decibels.

In some embodiments, the first plasticized polymer layer comprises plasticized poly(vinyl butyral) and the second plasticized polymer layer comprises plasticized poly(vinyl butyral). Additionally, the panel may include a third plasticized polymer layer comprised of plasticized poly(vinyl butyral), with the second plasticized polymer layer disposed between the first plasticized polymer layer and the third plasticized polymer layer.

In some embodiments, the first plasticized polymer layer has a residual hydroxyl content of greater than or equal to about 20 weight percent. In other embodiments, the second plasticized polymer layer has a residual hydroxyl content of less than or equal to about 15 weight percent and a plasticizer content of greater than or equal to about 70 phr.

In some alternative embodiments, the multiple layer glass panel has a deflection stiffness that is higher than the deflection stiffness of a multiple layer panel of the same thickness and glass configuration but with a conventional (non-stiff) interlayer, and in some embodiments, the multiple layer glass panel has a deflection stiffness that is at least 10% higher, or at least 20% higher than the deflection stiffness of a multiple layer panel of the same thickness and glass configuration but with a conventional (non-stiff) interlayer. In some embodiments, the multiple layer panel has a deflection stiffness of greater than about 250 Newtons per centimeter or greater than about 280 Newtons per centimeter when the combined thickness of the first glass substrate and the second glass substrate is less than or equal to 4.0 mm, or less than or to 3.9 mm, or less than or equal to 3.7 mm. The combined thickness of the first glass substrate and the second glass substrate also may be less than or equal to about 3.9 mm or less than or equal to about 3.7 mm.

Also disclosed herein is a multiple layer glass panel comprising: a first glass substrate; a second glass substrate; and a multilayered interlayer disposed between the first glass substrate and the second glass substrate. The multilayered interlayer comprises: a first plasticized polymer layer; and a second plasticized polymer layer in contact with the first plasticized polymer layer. The multilayered interlayer has an equivalent glass transition temperature (as defined below) of greater than or equal to about 29 degrees Celsius. In this embodiment, the combined thickness of the first glass substrate and the second glass substrate is less than or equal to about 4.0 mm, and the multiple layer glass panel has a deflection stiffness of that is higher than the deflection stiffness of a multiple layer panel of the same thickness and glass configuration but with a conventional (non-stiff) multilayered interlayer, and in some embodiments, the multiple layer glass panel has a deflection stiffness that is at least 10% higher, or at least 20% higher than the deflection stiffness of a multiple layer panel of the same thickness and glass configuration but with a conventional (non-stiff) multilayered interlayer. In some embodiments, the multiple layer panel has a deflection stiffness greater than or equal to about 240 Newtons per centimeter when the combined thickness of the first glass substrate and the second glass substrate is less than or equal to 4.0 mm, or less than or to 3.9 mm, or less than or equal to 3.7 mm. Additionally, the multiple layer glass panel has a sound transmission loss of greater than or equal to about 36 decibels.

In some embodiments, the first plasticized polymer layer comprises plasticized poly(vinyl butyral) and the second plasticized polymer layer comprises plasticized poly(vinyl butyral). Additionally, the panel may include a third plasticized polymer layer comprised of plasticized poly(vinyl butyral), with the second plasticized polymer layer disposed between the first plasticized polymer layer and the third plasticized polymer layer.

In some alternative embodiments, the multiple layer glass panel has a deflection stiffness that is higher than the deflection stiffness of a multiple layer panel of the same thickness and glass configuration but with a conventional (non-stiff) interlayer, and in some embodiments, the multiple layer glass panel has a deflection stiffness that is at least 10% higher, or at least 20% higher than the deflection stiffness of a multiple layer panel of the same thickness and glass configuration but with a conventional (non-stiff) interlayer. In some embodiments, the multiple layer panel has a deflection stiffness of greater than about 250 Newtons per centimeter or greater than about 280 Newtons per centimeter when the combined thickness of the first glass substrate and the second glass substrate is less than or equal to 4.0 mm, or less than or to 3.9 mm, or less than or equal to 3.7 mm. The combined thickness of the first glass substrate and the second glass substrate also may be less than or equal to about 3.9 mm or less than or equal to about 3.7 mm.

In other embodiments, the multilayered interlayer has an equivalent glass transition temperature of greater than or equal to about 31 degrees Celsius or greater than or equal to about 34 degrees Celsius.

Also described herein, among other things, are high rigidity interlayers and light weight multiple layer panels (incorporating the high rigidity interlayers) which have a significant reduction in weight from traditional multiple layer panels, without the significantly decreased strength associated with the use of thin glass combinations of either symmetric or asymmetric configurations. In one embodiment, for example, this light weight multiple layer panel is comprised of two glass or other applicable substrate panels which have a combined thickness of 4.0 mm or less and at least one interlayer having a glass transition temperature at least greater than 33° C., with the interlayer sandwiched between the two substrate panels. This resultant multiple layer panel may have a deflection stiffness at least 20% higher than the conventional multiple layer panel when used in either float or annealed glass. The light weight multiple layer panel may also have a deflection stiffness of at least 285 N/cm when used in either float or annealed glass of a combined substrate thickness of 3.7 mm.

In order to facilitate a more comprehensive understanding of the interlayers and multiple layer panels disclosed herein, the meaning of certain terms, as used in this application, will first be defined. These definitions should not be taken to limit these terms as they are understood by one of ordinary skill, but simply to provide for improved understanding of how terms are used herein.

The terms "polymer interlayer sheet," "interlayer," and "polymer melt sheet" as used herein, may designate a single-layer sheet or a multilayered interlayer. A "single-layer sheet," as the names implies, is a single polymer layer extruded as one layer. A multilayered interlayer, on the other hand, may comprise multiple layers, including separately extruded layers, co-extruded layers, or any combination of separately and co-extruded layers. Thus, the multilayered interlayer could comprise, for example: two or more single-layer sheets combined together ("plural-layer sheet"); two or more layers co-extruded together ("co-extruded sheet"); two or more co-extruded sheets combined together; a combination of at least one single-layer sheet and at least one co-extruded sheet; and a combination of at least one plural-layer sheet and at least one co-extruded sheet. In various embodiments of the present invention, a multilayered interlayer comprises at least two polymer layers (e.g., a single layer or multiple layers co-extruded) disposed in direct contact with each other, wherein each layer comprises a polymer resin. The term "resin," as utilized herein refers to the polymeric component (e.g., PVB) removed from the mixture that results from the acid catalysis and subsequent neutralization of polymeric precursors. Generally, plasticizer, such as those discussed more fully below, is added to the resins to result in a plasticized polymer. Additionally, resins may have other components in addition to the polymer and plasticizer including; e.g., acetates, salts and alcohols.

It should also be noted that while poly (vinyl butyral) ("PVB") interlayers are often specifically discussed as the polymer resin of the polymer interlayers in this application, it should be understood that other thermoplastic interlayers besides PVB interlayers may be used. Contemplated polymers include, but are not limited to, polyurethane, polyvinyl chloride, poly(ethylene vinyl acetate) and combinations thereof. These polymers can be utilized alone, or in combination with other polymers. Accordingly, it should be understood that when ranges, values and/or methods are given for a PVB interlayer in this application (e.g., plasticizer component percentages, thickness and characteristic-enhancing additives), those ranges, values and/or methods also apply, where applicable, to the other polymers and polymer blends disclosed herein or could be modified, as would be known to one of ordinary skill, to be applied to different materials.

The PVB resin is produced by known aqueous or solvent acetalization processes by reacting polyvinyl alcohol ("PVOH") with butyraldehyde in the presence of an acid catalyst, separation, stabilization, and drying of the resin. Such acetalization processes are disclosed, for example, in U.S. Pat. Nos. 2,282,057 and 2,282,026 and Vinyl Acetal Polymers, in Encyclopedia of Polymer Science & Technology, 3rd edition, Volume 8, pages 381-399, by B. E. Wade (2003), the entire disclosures of which are incorporated herein by reference. The resin is commercially available in various forms, for example, as Butvar® Resin from Solutia Inc.

In many embodiments, plasticizers are added to the polymer resin to form polymer interlayers. Plasticizers are generally added to the polymer resin to increase the flexibility and durability of the resultant polymer interlayer. Plasticizers work by embedding themselves between chains of polymers, spacing them apart (increasing the "free volume") and thus significantly lowering the glass transition temperature ($T_g$) of the polymer resin, making the material softer. In this regard, the amount of plasticizer in the interlayer can be adjusted to affect the glass transition temperature ($T_g$). The glass transition temperature ($T_g$) is the temperature that marks the transition from the glassy state of the interlayer to the rubbery state. In general, higher amounts of plasticizer loading can result in lower $T_g$. In various embodiments, and as described more fully in the examples, the high rigidity interlayer comprises a layer having a glass transition temperature of greater than about 33° C.

Contemplated plasticizers include, but are not limited to, esters of a polybasic acid, a polyhydric alcohol, triethylene glycol di-(2-ethylbutyrate), triethylene glycol di-(2-ethylhexonate) (known as "3-GEH"), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, and polymeric plasticizers such as oil-modified sebacic alkyds and mixtures of phospates and adipates, and mixtures and combinations thereof. 3-GEH is particularly preferred.

Generally, the plasticizer content of the polymer interlayers of this application are measured in parts per hundred resin parts ("phr"), on a weight per weight basis. For example, if 30 grams of plasticizer is added to 100 grams of polymer resin, the plasticizer content of the resulting plasticized polymer would be 30 phr. When the plasticizer content of a polymer layer is given in this application, the plasticizer content of the particular layer is determined in reference to the phr of the plasticizer in the melt that was used to produce that particular layer. In various embodiments, the high rigidity interlayer comprises a layer having a plasticizer content of less than about 35 phr and less than about 30 phr.

In addition to plasticizers, it is also contemplated that adhesion control agents ("ACAs") can also be added to the polymer resins to form polymer interlayers. ACAs generally function to alter the adhesion to the interlayer. Contemplated ACAs include, but are not limited to, the ACAs disclosed in U.S. Pat. No. 5,728,472, residual sodium acetate, potassium acetate, and/or magnesium bis(2-ethyl butyrate).

Other additives may be incorporated into the interlayer to enhance its performance in a final product and impart certain additional properties to the interlayer. Such additives include, but are not limited to, dyes, pigments, stabilizers (e.g., ultraviolet stabilizers), antioxidants, anti-blocking agents, flame retardants, IR absorbers or blockers (e.g., indium tin oxide, antimony tin oxide, lanthanum hexaboride ($LaB_6$) and cesium tungsten oxide), processing aides, flow enhancing additives, lubricants, impact modifiers, nucleating agents, thermal stabilizers, UV absorbers, UV stabilizers, dispersants, surfactants, chelating agents, coupling agents, adhesives, primers, reinforcement additives, and fillers, among other additives known to those of ordinary skill in the art.

One parameter used to describe the polymer resin components of the polymer interlayers of this application is residual hydroxyl content (as vinyl hydroxyl content or poly(vinyl alcohol) ("PVOH") content). Residual hydroxyl content refers to the amount of hydroxyl groups remaining as side groups on the chains of the polymer after processing is complete. For example, PVB can be manufactured by hydrolyzing poly(vinyl acetate) to poly(vinyl alcohol), and then reacting the poly(vinyl alcohol) with butyraldehyde to form PVB. In the process of hydrolyzing the poly(vinyl acetate), typically not all of the acetate side groups are converted to hydroxyl groups. Further, the reaction with butyraldehyde typically will not result in all of the hydroxyl groups being converted into acetal groups. Consequently, in any finished PVB, there will typically be residual acetate groups (such as vinyl acetate groups) and residual hydroxyl groups (such as vinyl hydroxyl groups) as side groups on the polymer chain. Generally, the residual hydroxyl content of a polymer can be regulated by controlling the reaction times and reactant concentrations, among other variables in the polymer manufacturing process. When utilized as a parameter herein, the residual hydroxyl content is measured on a weight percent basis per ASTM 1396.

In various embodiments, the poly(vinyl butyral) resin comprises about 9 to about 35 weight percent (wt. %) residual hydroxyl groups calculated as PVOH, about 13 to about 30 wt. % residual hydroxyl groups calculated as PVOH, about 9 to about 22 wt. % residual hydroxyl groups calculated as PVOH, or about 15 to about 22 wt. % residual hydroxyl groups calculated as PVOH; and for the high rigidity interlayers disclosed herein, for one or more of the layers, the poly(vinyl butyral) resin comprises greater than about 19 wt. % residual hydroxyl groups calculated as PVOH, greater than about 20 wt. % residual hydroxyl groups calculated as PVOH, greater than about 20.4 wt. % residual hydroxyl groups calculated as PVOH, and greater than about 21 wt. % residual hydroxyl groups calculated as PVOH. The resin can also comprise less than 25 wt. % residual ester groups, less than 15 wt. %, less than 13 wt. %, less than 11 wt. %, less than 9 wt. %, less than 7 wt. %, less than 5 wt. %, or less than 1 wt. % residual ester groups calculated as polyvinyl ester, e.g., acetate, with the balance being an acetal, preferably butyraldehyde acetal, but optionally including other acetal groups in a minor amount, for example, a 2-ethyl hexanal group (see, for example, U.S. Pat. No. 5,137,954, the entire disclosure of which is incorporated herein by reference).

Notably, for a given type of plasticizer, the compatibility of the plasticizer in the polymer is largely determined by the hydroxyl content of the polymer. Polymers with a greater residual hydroxyl content are typically correlated with reduced plasticizer compatibility or capacity. Conversely, polymers with a lower residual hydroxyl content typically will result in increased plasticizer compatibility or capacity. Generally, this correlation between the residual hydroxyl content of a polymer and plasticizer compatability/capacity can be manipulated and exploited to allow for addition of the proper amount of plasticizer to the polymer resin and to stably maintain differences in plasticizer content within multilayered interlayers.

In some embodiments of this application, the increased acoustic attenuation properties of soft layers are combined with the mechanical strength of stiff/rigid layers to create a multilayered interlayer. In these embodiments, a central soft layer is sandwiched between two stiff/rigid outer layers. This configuration of (stiff)//(soft)//(stiff) creates a multilayered interlayer that is easily handled, can be used in conventional lamination methods and that can be constructed with layers that are relatively thin and light. The soft layer is generally characterized by a lower residual hydroxyl content (e.g., less than or equal to 16 wt %, less than or equal to 15 wt %, or less than or equal to 12 wt %), a higher plasticizer content (e.g., greater than or equal to about 48 phr or greater than or equal to about 70 phr) and/or a lower glass transition temperature (e.g., less than 30° C. or less than 10° C.).

It is contemplated that polymer interlayer sheets as described herein may be produced by any suitable process known to one of ordinary skill in the art of producing polymer interlayer sheets that are capable of being used in a multiple layer panel (such as a glass laminate). For example, it is contemplated that the polymer interlayer sheets may be formed through solution casting, compression molding, injection molding, melt extrusion, melt blowing or any other procedures for the production and manufacturing of a polymer interlayer sheet known to those of ordinary skill in the art. Further, in embodiments where multiple polymer interlayers are utilized, it is contemplated that these multiple polymer interlayers may be formed through co-extrusion, blown film, dip coating, solution coating, blade, paddle, air-knife, printing, powder coating, spray coating or other processes known to those of ordinary skill in the art. While all methods for the production of polymer interlayer sheets known to one of ordinary skill in the art are contemplated as possible methods for producing the polymer interlayer sheets described herein, this application will focus on polymer interlayer sheets produced through the extrusion and co-extrusion processes. The final multiple layer glass panel laminate of the present disclosure are formed using processes known in the art.

Generally, in its most basic sense, extrusion is a process used to create objects of a fixed cross-sectional profile. This is accomplished by pushing or drawing a material through a die of the desired cross-section for the end product.

In the extrusion process, thermoplastic resin and plasticizers, including any of those resins and plasticizers described above, are generally pre-mixed and fed into an extruder device. Additives such as colorants and UV inhibitors (in liquid, powder, or pellet form) are often used and can be mixed into the thermoplastic resin or plasticizer prior to arriving in the extruder device. These additives are incorporated into the thermoplastic polymer resin, and by extension the resultant polymer interlayer sheet, to enhance certain properties of the polymer interlayer sheet and its performance in the final multiple layer glass panel product.

In the extruder device, the particles of the thermoplastic raw material and plasticizers, including any of those resins, plasticizers, and other additives described above, are further mixed and melted, resulting in a melt that is generally uniform in temperature and composition. Once the melt reaches the end of the extruder device, the melt is propelled into the extruder die. The extruder die is the component of the thermoplastic extrusion process which gives the final polymer interlayer sheet product its profile. Generally, the die is designed such that the melt evenly flows from a cylindrical profile coming out of the die and into the product's end profile shape. A plurality of shapes can be imparted to the end polymer interlayer sheet by the die so long as a continuous profile is present.

Notably, for the purposes of this application, the polymer interlayer at the state after the extrusion die forms the melt into a continuous profile will be referred to as a "polymer melt sheet." At this stage in the process, the extrusion die has imparted a particular profile shape to the thermoplastic resin, thus creating the polymer melt sheet. The polymer melt sheet is highly viscous throughout and in a generally molten state. In the polymer melt sheet, the melt has not yet been cooled to a temperature at which the sheet generally completely "sets." Thus, after the polymer melt sheet leaves the extrusion die, generally the next step in presently employed thermoplastic extrusion processes is to cool the polymer melt sheet with a cooling device. Cooling devices utilized in the previously employed processes include, but are not limited to, spray jets, fans, cooling baths, and cooling rollers. The cooling step functions to set the polymer melt sheet into a polymer interlayer sheet of a generally uniform non-molten cooled temperature. In contrast to the polymer melt sheet, this polymer interlayer sheet is not in a molten state and is not highly viscous. Rather, it is the set final-form cooled polymer interlayer sheet product. For the purposes of this application, this set and cooled polymer interlayer will be referred to as the "polymer interlayer sheet."

In some embodiments of the extrusion process, a co-extrusion process may be utilized. Co-extrusion is a process by which multiple layers of polymer material are extruded simultaneously. Generally, this type of extrusion utilizes two or more extruders to melt and deliver a steady volume throughput of different thermoplastic melts of different viscosities or other properties through a co-extrusion die into the desired final form. The thickness of the multiple polymer layers leaving the extrusion die in the co-extrusion process can generally be controlled by adjustment of the relative speeds of the melt through the extrusion die and by the sizes of the individual extruders processing each molten thermoplastic resin material.

As noted above, the interlayers of the present disclosure may be used as a single-layer sheet or a multilayered sheet. In various embodiments, the interlayers of the present disclosure (either as a single-layer sheet or as a multilayered sheet) can be incorporated into a multiple layer panel, and most commonly, disposed between two substrates. The two substrate panels of the disclosed multiple layer panel can be comprised of glass, plastic, or any other applicable substrate known for the production of multiple layer panels, but are most commonly comprised of glass. An example of such a construct would be: (glass)//(interlayer)//(glass). In an embodiment where the substrates are comprised of glass, it is contemplated that the glass may be annealed, heat strengthened or tempered. Further, the two substrates may be of the same thickness (e.g., 2 mm and 2 mm) or may be of an asymmetric thickness (e.g., 1.5 mm and 2.5 mm). All that is determinative is that the combined thickness of the panels be 4.0 mm or less. In one embodiment, the combined thickness of the substrates for the multiple layer glass panel will be 3.7 mm or lower for panels that will be utilized in windshield applications, 3.7 mm or lower for panels that will be utilized in side and rear window applications and 4.0 mm or lower for panels that will be utilized in roof window applications.

Without any intention of being limited to any theory or mechanism of operation, the reason why this multiple layer glass panel has improved strength, even in embodiments with panels with reduced glass thickness through asymmetric or symmetric configuration, is because the interlayer of this multiple layer panel contributes to the overall strength of the panel. This is because the interlayer having high stiffness in this multiple layer panel provides a significant membrane stress to the maximum flexural rigidity in the event of a bending.

The inclusion of an interlayer with high stiffness in the disclosed multiple layer panel creates a multiple layer panel with greater strength than a multiple layer panel with a conventional interlayer with the same type and thickness of substrate panels. This is because the interlayer of the disclosed multiple layer panel, in contrast to conventional interlayers, contributes more to the overall strength and rigidity of the panel. Thus, in contravention to conventional wisdom, the thickness of the multiple layer panel can be reduced without decreasing the strength of the panel.

For the purpose of the present disclosure, a conventional interlayer such as conventional PVB (designated as "Conventional Interlayer" or "Conventional PVB") is an interlayer containing a single-layered or monolithic interlayer such as a monolithic PVB interlayer and exhibiting a glass transition temperature of about 30° C. The Conventional PVB can be produced from PVB resin and plasticizer content as indicated in Table 1 below. The Conventional PVB can also be made with PVB resin of different hydroxyl content and plasticizer of different content to satisfy the glass transition temperature of about 30° C. Conventional acoustic multilayered interlayer such as conventional acoustic multilayered PVB interlayer (designated as "Conventional Acoustic PVB") is an interlayer comprising at least one layer of conventional PVB (i.e., Conventional PVB) and at least one layer of soft or acoustic PVB (exhibiting a glass transition temperature of less than about 30° C.).

Glass laminates using interlayers of the present disclosure can be prepared by known procedures. The polymer interlayer and glass are assembled and heated to a glass temperature of about 25° C. to 60° C. and then passed through a pair of nip rolls to expel trapped air to form an assembly. The compressed assembly is then heated, for example by infrared radiation or in a convection oven, to a temperature of about 70° C. to 120° C. The heated assembly is then passed through a second pair of nip rolls followed by autoclaving the assembly at about 130° C. to 150° C. and about 1,000 to 2,000 kilopascals (kPa) for about 30 minutes. Non-autoclave methods, such as those disclosed in U.S. Pat. No. 5,536,347 (the entire disclosure of which is incorporated herein by reference), are also useful. Further, in addition to the nip rolls, other means for use in de-airing of the interlayer-glass interfaces known in the art and that are commercially practiced include vacuum bag and vacuum ring processes in which a vacuum is utilized to remove the air.

In order to help comprehend the interlayer of the present disclosure, it is also useful to have an understanding of the properties and characteristics associated with a polymer interlayer sheet and formulas by which these properties and characteristics of a polymer interlayer sheet are measured. One quantitative way to determine the contribution of the PVB interlayer with high stiffness to the overall strength and rigidity of the multiple layer panel is the "deflection stiffness." The deflection stiffness is determined by a three point bending method which tests the edge strength, stiffness, flexural modulus and mechanical rigidity of the panel. In this method, a polymer interlayer test sheet is laminated between two substrates to form a panel. In one embodiment, a polymer interlayer test sheet with a thickness of about 0.76 millimeters is laminated between two panes of glass each having a thickness of 2.3 millimeters, a width of 2.54 centimeters, and a length of 30.5 centimeters. These thicknesses, widths, and lengths of the interlayer and glass are merely exemplary and not limiting. For example, differing glass thicknesses and configurations (e.g., asymmetric) are also commonly tested with the three point bending method.

Figure 2:
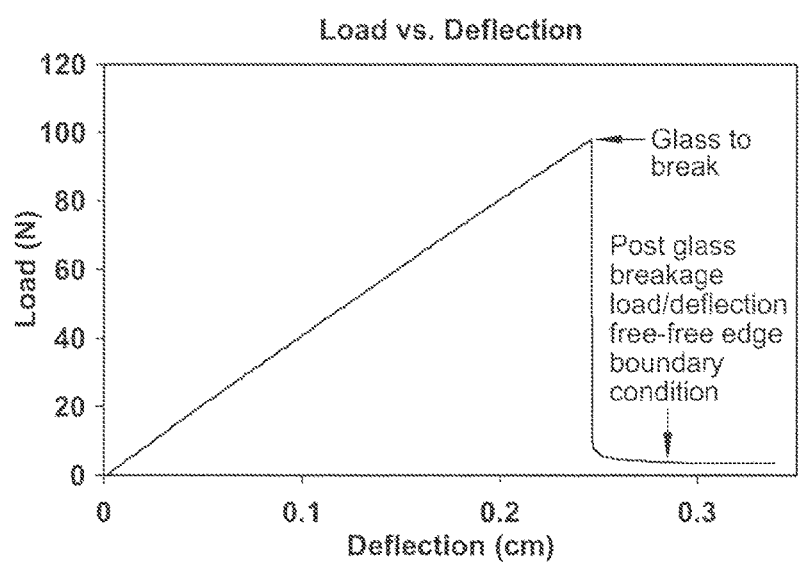
FIG. 2 provides a chart of the load versus the deflection of a test sheet in a three point bending test.

After the lamination process, the panel is then conditioned in a constant humidity (50%) and temperature (23° C.) setting for one to two hours before being subjected to the bending test. In this test, two fixed supports with a span of 19.0 centimeters are applied to the underside of the panel. A third point, a cylindrical rod, with a diameter of 0.953 centimeters and length of 5.08 centimeters, is applied at the upperside of the panel, generally at the center of the panel. Then a force is applied at the third point to create a constant velocity of about 1.27 mm/min on the test panel. A diagram of an embodiment of this three point bending test is provided in FIG. 1. Values for the load on the test panel (measured in Newtons, N) and the deflection of the test panel (measured in centimeters, cm) are recorded. These values are then plotted against each other, as seen in FIG. 2, to determine the stiffness of the laminate (deflection stiffness, measured in N/cm) which is equal to the average slope of the line created by plotting the load versus the deflection of the panel prior to breakage of glass or apparent drop in the load, i.e., the maximum load prior to breakage or apparent drop in the load divided by the corresponding deflection.

The acoustic attenuation as used to characterize glass laminates consisting of the multiple layered interlayers of the present invention is determined by sound transmission loss at the frequency corresponding to the coincident frequency of a reference monolithic glass panel of 4.8 millimeters (3/16 inches) thickness.

For purposes of the present invention a "coincident frequency" means the frequency at which a panel exhibits a dip in sound transmission loss due to "coincident effect". The coincident frequency ($f_c$) of the reference panel is typically in the range of 2,000 to 6,000 Hertz, and can be estimated from the algorithm:

$$f_c = \frac{15{,}000}{d}$$

where "d" is the total glass thickness in millimeters and "$f_c$" is in Hertz.

For reference panels of fixed dimensions and laminates/multiple layer panels of the present disclosure, the reduction in sound transmission (i.e., sound transmission loss) is determined in accordance with ASTM E90 (05) at a fixed temperature of 20° C. The dimension of the test panel is 80 centimeters in length, 50 centimeters in width, and the thickness of the reference panel and the combined thickness of glass for the multiple layered interlayer panels are indicated in Table 2.

In various embodiments of the present disclosure, the multilayered interlayers, when laminated between two panes of glass, exhibit reductions in transmission of sound as conventional acoustic interlayers, with the sound transmission loss generally greater than 35 decibels (dB) and greater than 36 dB. In other embodiments of the present disclosure, the multilayered interlayers, when laminated between two panes of glass, exhibit the same reduction in transmission of sound as conventional acoustic interlayers, with the sound transmission loss generally greater than about 39 dB.

The glass transition temperature is also used to describe the polymer interlayers of the present disclosure. The glass transition temperature ($T_g$) is determined by dynamic mechanical analysis (DMA). The DMA measures the storage (elastic) modulus (G') in Pascals, loss (viscous) modulus (G") in Pascals, loss (damping) factor (LF) [tan(delta)] of the specimen as a function of temperature at a given frequency, and temperature sweep rate. The polymer sheet sample is tested in shear mode at an oscillation frequency of 1 Hertz as the temperature of the sample is increased from −20° C. to 70° C. at a rate of 2° C./minute. The $T_g$ is then determined by the position of the loss factor peak on the temperature scale in ° C.

To further define the multilayered interlayer comprising at least one high stiffness layer and one acoustic attenuating layer, equivalent glass transition temperature ($T_{eq}$) of the interlayer is used. The equivalent glass transition temperature of the above two layers is defined as:

$$T_{eq} = \frac{(T_{g1} \times w_1) + (T_{g2} \times w_2)}{w_1 + w_2}$$

where $T_{g1}$ is the glass transition temperature of the high rigidity layer, $w_1$ is the thickness of the high rigidity layer, $T_{g2}$ is the glass transition temperature of the acoustic attenuating layer, and $w_2$ is the thickness of the acoustic attenuating layer.

For the multilayered interlayer comprising additional layers in addition to a high stiffness layer and an acoustic attenuating layer, the equivalent glass transition is defined as the sum of the glass transition temperature of each layer multiplied by the thickness of the corresponding layer and dividing this sum by the total thickness of the interlayer.

EXAMPLES

Multiple layer panels of differing glass configuration thicknesses were constructed with the disclosed high rigidity interlayer monolithic (i.e., single-layer) interlayers (designated as "Stiff PVB-1" and "Stiff PVB-2" and as shown in Table 1) with an interlayer thickness of about 0.76 mm. Similarly, multiple layer panels of differing glass configuration thicknesses were constructed with acoustic monolithic interlayers (designated as "Soft PVB" and as shown in Table 1) and conventional monolithic interlayers (designated as "Conventional PVB" and as shown in Table 1) with interlayer thicknesses of about 0.76 mm. All the multiple layer glass panels were subjected to the three point bending test method to determine deflection stiffness.

TABLE 1

| Type of interlayer | PVOH content in PVB (wt %) | Plasticizer (3-GEH) Content (phr) in PVB | Glass Transition Temperature (° C.) | Glass Configuration (mm) | Deflection Stiffness (N/cm) |
|---|---|---|---|---|---|
| Soft PVB | 16 | 48 | 20 | 2.3/2.3 | 288 |
|  |  |  |  | 2.1/2.1 | 244 |
|  |  |  |  | 2.3/1.6 | 206 |
|  |  |  |  | 2.1/1.6 | 164 |
| Conventional PVB | 19 | 38 | 30 | 2.3/2.3 | 373 |
|  |  |  |  | 2.1/2.1 | 318 |
|  |  |  |  | 2.3/1.6 | 287 |
|  |  |  |  | 2.1/1.6 | 242 |
| Stiff PVB-1 | 19 | 30 | 35 | 2.3/2.3 | 539 |
|  |  |  |  | 2.1/2.1 | 433 |
|  |  |  |  | 2.3/1.6 | 382 |
|  |  |  |  | 2.1/1.6 | 360 |
| Stiff PVB-2 | 19 | 20 | 46 | 2.3/2.3 | 1198 |
|  |  |  |  | 2.1/2.1 | 988 |
|  |  |  |  | 2.3/1.6 | 823 |
|  |  |  |  | 2.1/1.6 | 785 |

As can be seen from the results in Table 1, the presently disclosed "Stiff PVB" interlayers have a high contribution to the stiffness of the multiple layer panel when compared to conventional or soft interlayers. In fact, the multiple layer panel with the disclosed stiff or high rigidity interlayers (i.e., "Stiff PVB") will result in a multiple layer panel with a deflection stiffness at least 20% higher than a multiple layer panel of the same thickness and glass configuration but with a conventional (non-stiff) interlayer.

Table 1 further demonstrates that plasticizer content contributes to the stiffness of the polymer interlayer sheet. As seen in Table 1, polymer interlayer sheets having a plasticizer content of 30 phr or less are associated with higher deflection stiffness levels—the lower the percentage of plasticizer in the polymer interlayer, the stiffer the interlayer. Thus, plasticizer content can be used as a parameter to create and identify stiffer polymer interlayer sheets.

Figure 3:
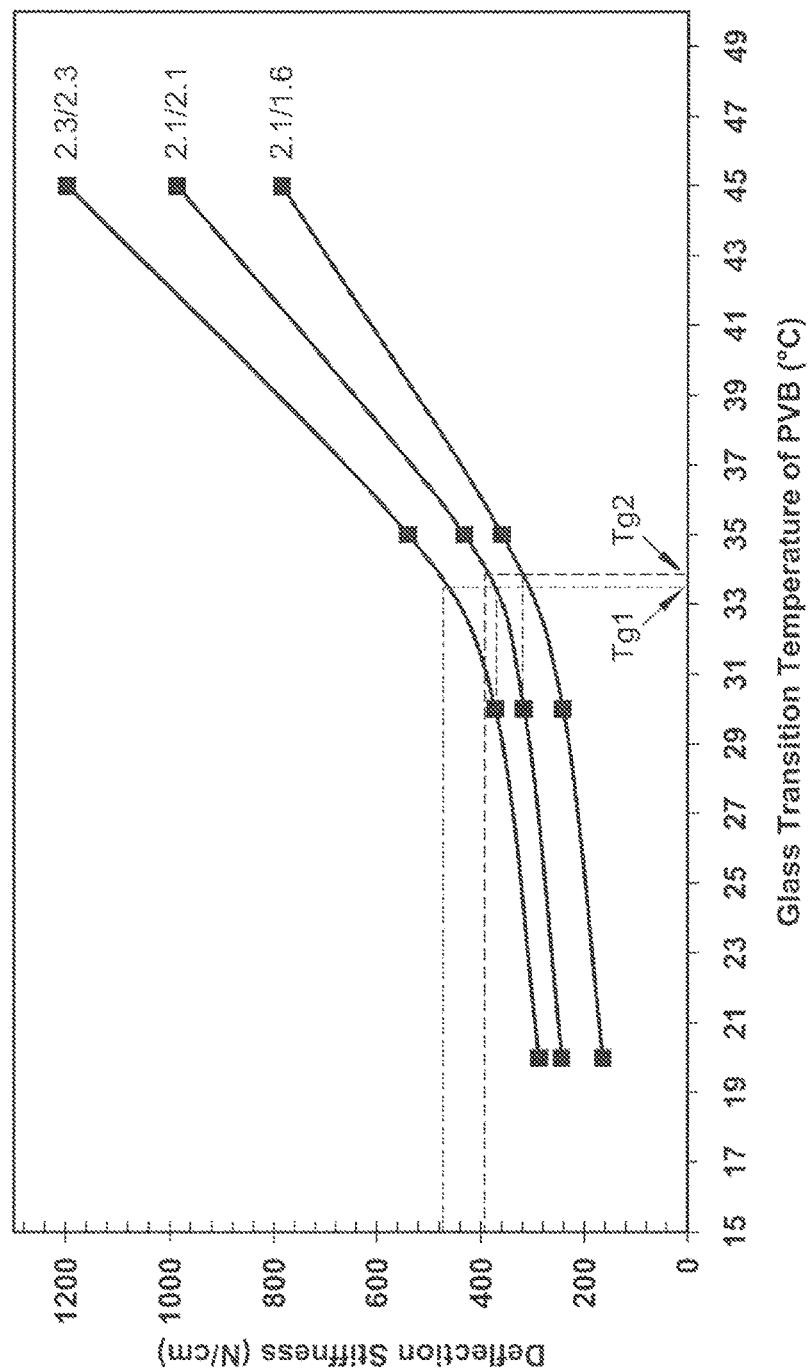
FIG. 3 provides a chart demonstrating the correlation of glass transition temperature of the interlayer with stiffness of the multiple layer panel.

Table 1 also demonstrates that, in addition to plasticizer content, the deflection stiffness of a multiple layer panel is directly correlated with the glass transition temperature of the PVB interlayer in the multiple layer panel—the greater the glass transition temperature of the PVB interlayer, the greater the bending stiffness of the multiple layer panel. This correlation is further shown in FIG. 3, which depicts the deflection stiffness vs. glass transition temperature of the interlayer and glass configurations from Table 1. FIG. 3 also shows that the deflection stiffness is greatly influenced by the nature of the interlayer sandwiched between the substrate panels.

Additionally, FIG. 3 demonstrates that there is an apparent deflection point present in the deflection stiffness vs. glass transition temperature of the interlayer for each of the glass configurations and occurs at about 33° C. Above this temperature, the deflection stiffness of the multiple layer panel increases more rapidly at temperatures of 33° C. or above than at temperatures below 33° C. Thus, a PVB interlayer with a glass transition temperature of about 33° C. or higher results in an interlayer with a high rigidity/stiffness. In comparison, conventional PVB interlayers generally have a glass transition temperature of 30° C.

The influence of the disclosed interlayers on the deflection stiffness can be further demonstrated in FIG. 3. Specifically, FIG. 3 shows that, by using the disclosed high rigidity interlayers, the glass thickness can effectively be reduced while maintaining the same deflection stiffness. This can be demonstrated by the following process as shown in FIG. 3. A horizontal line (long dashed line) is drawn from the point representing the panel having 2.1/2.1 glass thickness configuration and conventional PVB interlayer (i.e., glass transition temperature of 30° C.) until this horizontal line intersects the curve of deflection stiffness vs. glass transition temperature for 2.1/1.6 glass configuration. The corresponding temperature ($T_{g2}$) is obtained from the intersecting point. This temperature, which is about 33.8° C., corresponds to a stiff PVB interlayer in the panel having 2.1/1.6 glass configuration that is equivalent in deflection stiffness to the panel having 2.1/2.1 glass configuration and with conventional PVB (i.e., 30° C.). In other words, a panel having 2.1/1.6 glass configuration and a PVB interlayer having glass transition temperature of $T_{g2}$ (33.8° C.) will have deflection stiffness equivalent to a panel having 2.1/2.1 glass configuration and a conventional PVB interlayer.

The long dashed line is then drawn up vertically from the intersecting point of the 2.1/1.6 deflection stiffness curve until the vertical line intersects the deflection stiffness curve of 2.1/2.1 glass configuration. The deflection stiffness corresponding to the intersecting point on the 2.1/2.1 glass deflection stiffness curve is determined to be about 390 N/cm. Thus, when in the same glass configuration (i.e., 2.1/2.1), the panel with PVB interlayer having glass transition temperature of 33.8° C. will be about 22.6% stiffer than the panel with a conventional PVB interlayer (deflection stiffness of 318 N/cm).

The above procedures can be applied to a 2.3/2.3 glass panel having a conventional interlayer. As shown in FIG. 3, the 2.3/2.3 glass panel with a conventional interlayer has a deflection stiffness of about 373 N/cm. A horizontal line (short dashed line in FIG. 3) is then drawn to the point where the line intersects the 2.1/2.1 glass panel to determine the glass transition temperature of the disclosed interlayer (i.e., $T_{g1}$=33.4° C.). As can be seen, the deflection stiffness corresponding to the disclosed interlayer (i.e., glass transition temperature of 33.4° C.) in the 2.3/2.3 panel is about 470 N/cm (short dashed line as shown in FIG. 3). Thus, the disclosed interlayer will contribute to the overall deflection stiffness of the panel by an additional 26% (i.e., 470 N/cm compared to 373 N/cm).

Figure 4:
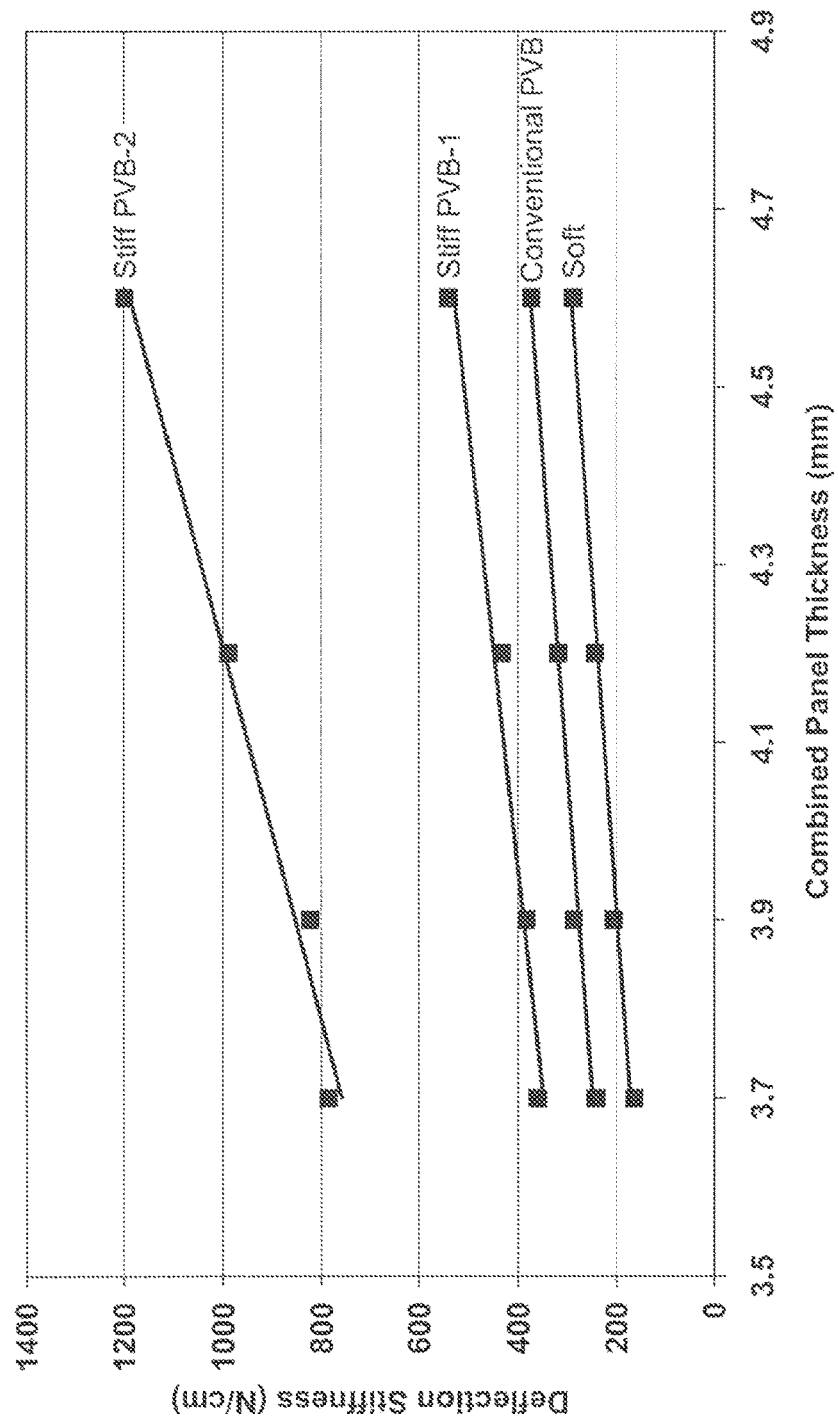
FIG. 4 provides a chart demonstrating the correlation the improved stiffness of the disclosed multiple layer panel for various different panel thicknesses.

FIG. 4 depicts the deflection stiffness vs. the combined glass thickness of the interlayers from Table 1. This figure further demonstrates the effect the disclosed interlayers have on the deflection stiffness of the multiple layer panel. As clearly shown in FIG. 4, Stiff PVB-1 contributes to the deflection stiffness of the multiple layer panel in such a manner that the deflection stiffness of the light weight glass panels (i.e., total combined glass thickness of 3.7 mm) is essentially equivalent to the heavier multiple layer panel having a combined glass thickness of 4.6 mm and with a conventional PVB interlayer. Thus, the multiple layer panel with Stiff PVB-1 can afford a reduction in glass thickness by as much as 0.9 mm, or 19.6% weight saving in glass, from a multiple layer panel having a conventional PVB interlayer and a combined glass thickness of 4.6 mm while maintaining equivalent stiffness and mechanical rigidity.

In another embodiment of this application, multilayered interlayers having high rigidity layers are also incorporated into a multiple layer panel. For example, in addition to the two substrate panels which have a combined thickness of 4.0 mm or less and the stiff PVB layer (i.e., a PVB layer having a glass transition temperature of at least 33° C.), the light weight multiple layer panel may further comprise a PVB layer that exhibits a glass transition temperature significantly lower than that of conventional PVB (i.e., the second PVB layer). In an embodiment, this second PVB layer will have a glass transition temperature of 15° C. or lower. This additional PVB layer with a low glass transition temperature is included to improve the acoustic attenuation (i.e., sound reduction) of the multiple layer panel.

Table 2 provides numerous examples of the disclosed multilayered interlayer constructions (designated as "Interlayers 1-8") for various glass configurations (to form multiple layer glass panels of various thicknesses). The "Conventional Acoustic PVB" interlayer refers to the previously utilized conventional acoustic interlayers. All the multilayered interlayers were subjected to the three point bending method to determine deflection stiffness. Table 3 provides the compositions and characteristics of the layers shown in Table 2.

TABLE 2

| Interlayer No | Multilayered interlayer construction | | | Equivalent Glass Transition Temperature (° C.) | Glass configuration (mm or mm/mm) | Deflection Stiffness (N/cm) | Sound Transmission Loss (dB) |
|---|---|---|---|---|---|---|---|
| | Layer 1 | Layer 2 | Layer 3 | | | | |
| Reference | — | — | — | — | 4.7 | — | 29 |
| Conventional Acoustic PVB | PVB-1 | PVB-2 | PVB-1 | 25.9 | 2.3/2.3 | 315 | 39 |
| | | | | | 2.1/2.1 | 282 | 39 |
| | | | | | 2.1/1.6 | 213 | 39 |
| Interlayer-1 | PVB-3 | PVB-4 | PVB-3 | 28.3 | 2.3/2.3 | 335 | 34 |
| | | | | | 2.1/2.1 | 299 | 34 |
| | | | | | 2.1/1.6 | 234 | 34 |
| Interlayer-2 | PVB-5 | PVB-2 | PVB-5 | 31.5 | 2.3/2.3 | 350 | 40 |
| | | | | | 2.1/2.1 | 326 | 39 |
| | | | | | 2.1/1.6 | 258 | 39 |
| Interlayer-3 | PVB-6 | PVB-2 | PVB-6 | 33.2 | 2.3/2.3 | 402 | 39 |
| | | | | | 2.1/2.1 | 362 | 39 |
| | | | | | 2.1/1.6 | 280 | 39 |
| Interlayer-4 | PVB-7 | PVB-2 | PVB-7 | 34 | 2.3/2.3 | 403 | 39 |
| | | | | | 2.1/2.1 | 378 | 39 |
| | | | | | 2.1/1.6 | 290 | 39 |
| Interlayer-5 | PVB-7 | PVB-8 | PVB-7 | 35.2 | 2.3/2.3 | 437 | 38 |
| | | | | | 2.1/2.1 | 406 | 38 |
| | | | | | 2.1/1.6 | 318 | 38 |
| Interlayer-6 | PVB-9 | PVB-2 | PVB-9 | 29 | 2.3/2.3 | 341 | 39 |
| | | | | | 2.1/2.1 | 314 | 39 |
| | | | | | 2.1/1.6 | 240 | 39 |
| Interlayer-7 | PVB-10 | PVB-2 | PVB-10 | 30.7 | 2.3/2.3 | 363 | 39 |
| | | | | | 2.1/2.1 | 317 | 39 |
| | | | | | 2.1/1.6 | 242 | 39 |
| Interlayer-8 | PVB-7 | PVB-11 | PVB-7 | 32.2 | 2.3/2.3 | 388 | 39 |
| | | | | | 2.1/2.1 | 345 | 39 |
| | | | | | 2.1/1.6 | 277 | 39 |

TABLE 3

| PVB layer | PVOH content in PVB (wt %) | Plasticizer (3-GEH) Content (phr) in PVB | Sheet Thickness (mil) | Glass transition temperature (° C.) |
|---|---|---|---|---|
| PVB-1 | 18.7 | 38 | 14 | 30 |
| PVB-2 | 11.8 | 75 | 5 | 3 |
| PVB-3 | 15.4 | 28 | 13 | 32 |
| PVB-4 | 11.8 | 55 | 5 | 9 |
| PVB-5 | 21 | 35 | 13 | 37 |
| PVB-6 | 21 | 30 | 13 | 39 |
| PVB-7 | 21 | 28 | 13 | 40 |
| PVB-8 | 11.8 | 75 | 4 | 3 |
| PVB-9 | 20.4 | 35 | 13 | 34 |
| PVB-10 | 20.8 | 34 | 13 | 36 |
| PVB-11 | 10 | 75 | 5 | −3 |

As Table 2 demonstrates, the high rigidity layers (layers 1 and 3) in multilayered Interlayers 2-8 contribute to the deflection stiffness of the multiple layer panel in such a way that the deflection stiffness of the lighter weight glass configuration (i.e., combined glass thickness of 3.7 mm) is essentially equivalent to the heavier multiple layer panel (i.e., combined glass thickness of 4.2 mm) having a conventional multilayered interlayer (designated as "Conventional Acoustic PVB). Thus, the multiple layer panel comprising the disclosed multilayered interlayers (i.e., Interlayers 2-8—with high rigidity PVB layers (layers 1 and 3) and an acoustic attenuating interlayer (layer 2)) can afford a reduction in glass thickness by as much as 0.5 mm, or 11.9% weight saving in glass, when compared to heavier, previously utilized multiple layer panels with conventional multilayered interlayers. Moreover, the light weight multiple layer panels comprising the multilayered interlayers with high rigidity layers maintain equivalent stiffness, mechanical rigidity, and acoustic properties as the heavier, previously utilized multiple layer panels with conventional acoustic interlayers.

Table 2 also demonstrates the dependence of the deflection stiffness of the multilayered interlayer panel on the equivalent glass transition temperature. Increasing the equivalent glass transition temperature of the interlayer increases its deflection stiffness. It is apparent that the panels having interlayers having the equivalent glass transition temperature of at least 28.5° C. and higher have the improved deflection stiffness over the panels having conventional acoustic PVB interlayers.

It should be noted that while Interlayer-1 provides improved deflection stiffness over the conventional acoustic PVB, its acoustic attenuation is significantly lower and not desirable for applications requiring acoustic attenuation. Thus, multilayered interlayers with significantly reduced acoustic attenuation such as Interlayer-1 are generally not preferred.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, a polymer layer can be formed comprising plasticizer content in any of the ranges given in addition to any of the ranges given for residual hydroxyl content, where appropriate, to form many permutations that are within the scope of the present invention but that would be cumbersome to list.

We claim:

1. A multi-layer glass panel comprising:
a first glass substrate;
a second glass substrate; and
a multilayer interlayer comprising a first polymer layer and a second polymer layer in contact with said first polymer layer, wherein said second polymer layer has a thickness less than the thickness of said first polymer layer, and wherein said second polymer layer has a thickness of from about 0.10 to about 0.13 mm, and
a third polymer layer in contact with said second polymer layer, and wherein said second polymer layer is between said first and said third polymer layers,
wherein said first, second and third polymer layers comprise plasticized poly(vinyl butyral),
wherein said multilayer interlayer is disposed between said first and second glass substrates, wherein said first polymer layer has a glass transition temperature greater than 35° C., wherein said second polymer layer has a glass transition temperature less than 20° C., and wherein the combined thickness of said first glass substrate and said second glass substrate is less than or equal to 4.0 mm; wherein said multi-layer glass panel has a deflection stiffness of greater than about 250 Newtons per centimeter.

2. The multi-layer glass panel of claim 1 wherein the combined thickness of said first glass substrate and said second glass substrate is less than or equal to 3.9 mm.

3. The multi-layer glass panel of claim 1 wherein the thickness of said second glass substrate is less than the thickness of said first glass substrate.

4. The multi-layer glass panel of claim 1 wherein said first glass substrate and said second glass substrate have a combined thickness of less than or equal to 3.7 mm.

5. The multi-layer glass panel of claim 1 wherein the multi-layer interlayer has an equivalent glass transition temperature, $T_{eq}$, of greater than or equal to 29° C.

6. The multi-layer glass panel of claim 1 wherein said third polymer layer has a glass transition temperature greater than 33° C.

7. A multi-layer glass panel comprising:
a first glass substrate;
a second glass substrate; and
a multilayer interlayer comprising a first polymer layer comprising plasticized poly(vinyl butyral) having a residual hydroxyl content of greater than or equal to 19 weight percent, wherein said first polymer layer has a plasticizer content of less than or equal to about 35 phr, and a second polymer layer comprising plasticized poly(vinyl butyral) having a residual hydroxyl content of less than or equal to 16 weight percent, wherein said second polymer layer has a plasticizer content of greater than or equal to about 48 phr, wherein said second polymer layer is in contact with said first polymer layer, wherein said first polymer layer has a glass transition temperature greater than 35° C. and said second polymer layer has a glass transition temperature of less than 20° C. and, wherein said second polymer layer has a thickness less than the thickness of said first polymer layer, wherein said second polymer layer has a thickness of from about 0.10 to about 0.13 mm, and
a third polymer layer in contact with said second polymer layer, said third polymer layer comprising plasticized poly(vinyl butyral) having a residual hydroxyl content of greater than or equal to 19 weight percent, wherein said third polymer layer has a plasticizer content of less than or equal to about 35 phr, and wherein said second polymer layer is between said first and said third polymer layers,
wherein the combined thickness of said first glass substrate and said second glass substrate is less than or equal to 4.0 mm, and wherein said multi-layer glass panel has a deflection stiffness of greater than about 250 Newtons per centimeter.

8. The multi-layer glass panel of claim 7, wherein the thickness of said second glass substrate is less than the thickness of said first glass substrate.

9. The multi-layer glass panel of claim 1 wherein the multi-layer interlayer has an equivalent glass transition temperature, $T_{eq}$, of at least about 28.5° C.

10. The multi-layer glass panel of claim 7 wherein said multi-layer interlayer has an equivalent glass transition temperature, $T_{eq}$, of at least about 28.5° C.

11. The multi-layer glass panel of claim 7 wherein the combined thickness of said first glass substrate and said second glass substrate is less than or equal to about 3.7 mm.

12. The multi-layer glass panel of claim 1, wherein said multilayer interlayer is disposed between said first and second glass substrates such that said first polymer layer is in contact with said first glass substrate and said third polymer layer is in contact with said second glass substrate, wherein said third polymer layer has a glass transition temperature greater than 35° C.

13. The multi-layer glass panel of claim 7, wherein said first glass substrate has a thickness of not more than 2.3 mm and wherein said second glass substrate has a thickness of not more than 1.6 mm.

14. The multi-layer glass panel of claim 7, wherein said multilayer interlayer is disposed between said first and said second glass substrates such that said first polymer layer is in contact with said first glass substrate and said third polymer layer is in contact with said second glass substrate, wherein said third polymer layer has a glass transition temperature greater than 35° C.

* * * * *